May 12, 1959 N. A. VOGEL 2,886,651

AIR HEAD

Filed April 8, 1955

INVENTOR.
NORMAN A. VOGEL

BY John B. Clark

ATTORNEY

United States Patent Office 2,886,651

Patented May 12, 1959

2,886,651

AIR HEAD

Norman A. Vogel, Santa Clara County, Calif., assignor to International Business Machines Corporation, New York, N.Y., a corporation of New York Application April 8, 1955, Serial No. 500,125

7 Claims. (Cl. 179—100.2)

The present invention appertains generally to magnetic recording heads and more particularly to air stabilized magnetic recording heads hereinafter referred to simply as "air heads."

As is well known in the magnetic recording art, it is desirable to prevent the magnetic transducer from engaging the recording media to thereby prevent unnecessary wear and also possible damage to the recording media. Air heads have been successfully utilized for spacing transducers from the recording surface; however, it will be understood that in most prior air heads failure of the air supply results in engagement of the recording media by the head and the concomitant ill effects. It is one object of the present invention, therefore, to provide an improved air head having a fail-safe characteristic whereby the head is moved away from the recording surface upon the failure of the air supply.

The fail-safe feature may be obtained in at least two ways. In one, the head is biased away from the recording surface, and when no air is supplied to the head it assumes an inoperative position away from the surface due to the bias. When, however, air is supplied to the head, the same air used for the bearing is utilized to operate a piston which overcomes the bias and pushes the head into its operative position adjacent the recording surface. Thus, if the air supply fails, the head is returned to its inoperative position away from the surface and no damage results.

A second method of obtaining the fail-safe feature, as taught by the present invention, is to bias the head away from the recording surface as above, but instead of using an air piston to push it into operative position, a head having sufficient attraction to the remote surface to overcome the effect of the bias is utilized to draw itself into operative position adjacent the surface. By means of the present invention, the same air utilized for the air bearing develops forces which draw and hold the head to the surface, and failure of the air supply results in the failure of each of these forces, thereby permitting the bias or preload to return the head to its inoperative position. Thus, it is another object of the present invention to provide an improved air head having the ability to overcome a preload and to draw itself from a position remote from the recording surface to a position adjacent the recording surface.

Still another object is to provide an improved air head wherein means are utilized to position the head in an inoperative position away from the recording media when insufficient air is supplied thereto and which, when supplied with sufficient air, is controlled by the air exhausting therefrom to draw itself to an operative position adjacent the recording media.

As is well known, an air head must develop sufficient force to hold itself to the recording surface to enable it to follow the surface in the event of irregularities or run-out, and assuming everything else remains constant this holding force (which has been attributed to the Bernoulli effect) drops rapidly as the distance between the head and the surface is increased. Additionally, the fail-safe air head of the present invention must develop a pulling force which is sufficient to draw it to the surface, at which time the holding force and the pulling force coact to cause the head to follow the recording surface. It is a still further object of the present invention, therefore, to provide an air head having improved ability to draw itself to a surface from a position remote therefrom and also having sufficient holding force to cause it to follow the surface.

While prior air heads have the ability to develop strong holding forces, no prior art heads are adapted to develop a sufficient pulling force to utilize the fail-safe feature as taught herein. Thus, it is still another object of this invention to provide an air head having sufficient holding as well as sufficient drawing forces to permit fail-safe operation of the head as taught herein.

Other objects of the invention will be pointed out in the following description and claims and illustrated in the accompanying drawings which disclose, by way of example, the principle of the invention and the best mode which has been contemplated of applying that principle.

Figures 1, 2, 3:
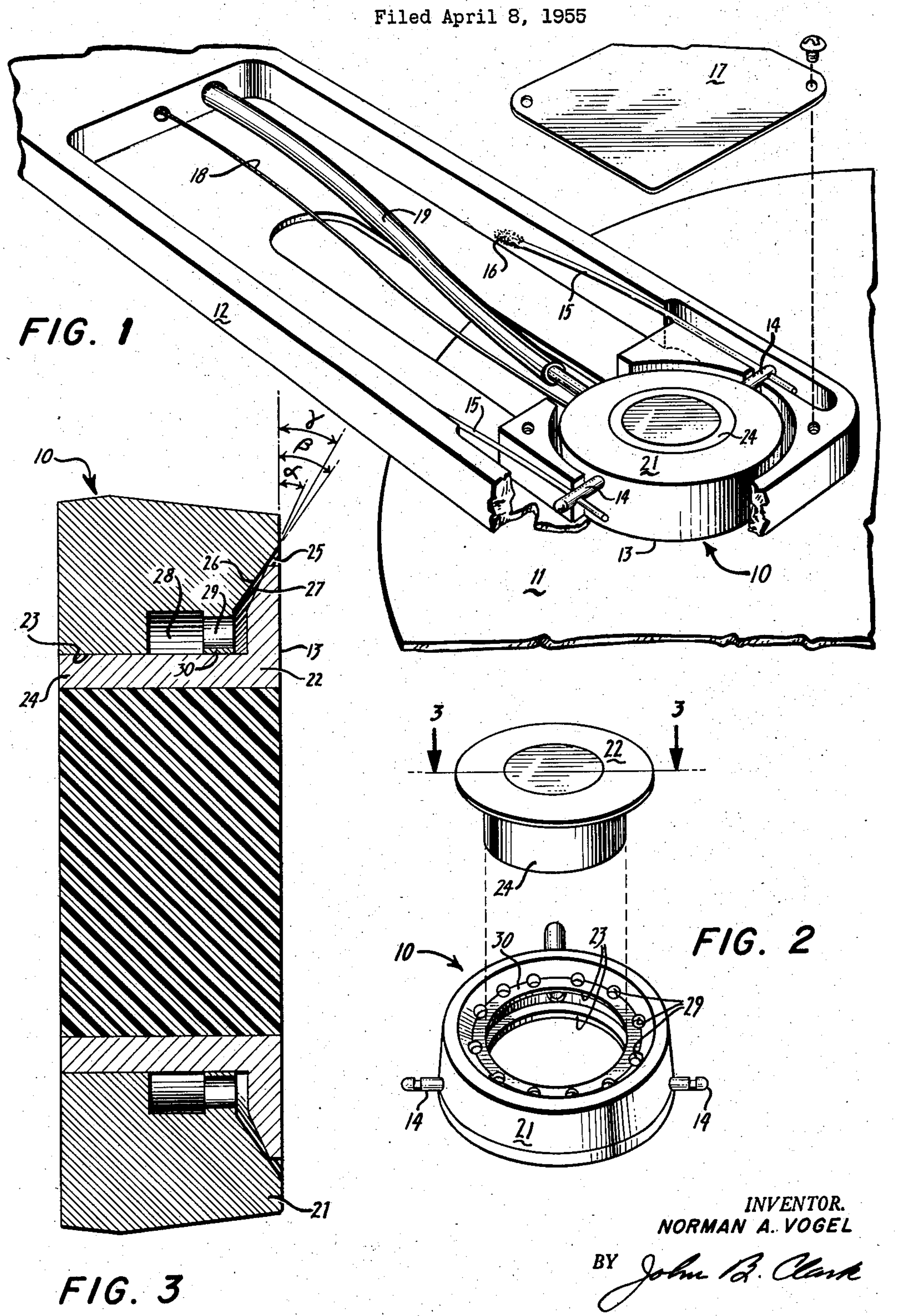
Fig. 1 is a perspective view of the air head of the invention supported adjacent a recording surface.
Fig. 2 is an expanded perspective view of the novel air head.
Fig. 3 is a section taken along the line 3—3 of Fig. 2.

The novel air head 10 (Fig. 1) is supported adjacent a recording surface 11 by an arm 12 in such a way that the face 13 (Fig. 2) of the head is disposed in opposed relation to the surface 11. Studs 14 (Fig. 1) secured to and extending laterally from each side of the head 10 are slidably fitted into suitable notches provided therefor in the arm 12 to permit vertical movement of the studs 14 within these notches. The head 10 is biased upwardly away from the surface 11 by springs 15, one end of each of which is welded to the arm 12 as at 16 and the other end of each of which engages the studs 14 to thereby yieldably support the head in position. It will be understood, however, that the springs 15 are deflectible to permit the head to be moved toward the recording surface 11. In the present embodiment, the head is normally positioned a distance of about .050 inch away from the recording surface, a cover plate 17 being provided to limit the travel of the head 10 upwardly. As shown in Fig. 1, suitable electrical wiring 18 extends from the transducer (not shown) disposed in the center portion of the head 10, through the arm to suitable control structure, and also air is supplied to the head through a tubing 19 for use as will now be described.

Referring now to Figs. 2 and 3, the air head 10 comprises a main body portion 21 and a bonnet 22, the body being circularly apertured at 23 (Fig. 2) to receive therein a downwardly extending cylindrical portion 24 of the bonnet 22. The orifice 25 through which the air escapes from the head is circular and is defined by the opposed surfaces 26 and 27 of the body and bonnet, respectively, which surfaces are spaced apart to permit sufficient air flow therethrough. The body 21 is provided with a trough or manifold 28 extending therearound, which connects to a source of air through the tubing 19 and which also connects to the circular orifice 25 through a plurality of circularly arranged apertures 29 extending from the manifold 28 through one wall 30 thereof to the orifice. Thus, when air is supplied to the manifold 28 through the tubing 19, it escapes through the orifice 25 to the atmosphere.

The angle of exhaust of the air flowing from the orifice 25 is important to the operation of the present invention, as will be explained, and is determined by the mean of the angles of the opposed surfaces 26 and 27 which define the orifice. In the discussion to follow, all angles are referenced to the plane of the face 13 of the head.

It has been found experimentally that the smaller the angle of exhaust, i.e., the smaller the angle $\gamma$ (Fig. 3), the greater the force $F_h$ which holds the head to the recording surface. This is believed to be due to the fact that there is a minimum of turbulence in the exhausting air stream, thereby permitting a higher velocity of air flow between the opposed surfaces. This holding force, however, is effective only to maintain the head in its position of equilibrium adjacent the recording surface, and as the head is moved away from the surface $F_h$ decreases rapidly to a point where it is insufficient to overcome the counteraction of the springs 15, and the head is, therefore, unable to pull itself into its operative position adjacent the recording surface.

In many applications, such as where the head is to be utilized to coact with several moving recording surfaces and is to be moved from one such surface to another, it is desirable to maintain the head a safe distance away from the surface while it is being moved to prevent possible damage to the various parts. While any convenient and safe distance may be utilized, a condition which spaces the face 13 of the head approximately .050 inch from the recording surface when it is in its inoperative position has been found to be satisfactory. However, when spaced at this distance the pulling force of a "zero-degree" air head is sufficient to pull the head to the surface. It has been found that by increasing the angle $\gamma$, the pulling force $F_p$ may be increased to where it is sufficient to pull the head into its operative position. Satisfactory pulling forces $F_p$ are found to be developed when the angle $\gamma$ lies somewhere between 20° and 40°, $F_p$ appearing to reach a maximum at around 30° and dropping off on either side thereof. Increasing the angle $\gamma$ results in lowering $F_h$ due to the increased turbulence of the exhausting air and other factors which it is deemed unnecessary to explain herein. However, $F_h$ is still well within usable limits as long as $\gamma$ does not exceed 40°.

It will be noted that the air exhausting from the orifice 25 is in the form of a frustrum of a cone. The pulling force $F_p$ is believed to be the result of a low pressure area within the boundary of the frustrum developed by the air flow. This low pressure area is at a minimum when $\gamma$ equals 0° and increases as $\gamma$ increases. This would seem to explain why the pulling force increases as $\gamma$ is increased from 0° to 30°. As $\gamma$ is further increased, as stated above, $F_p$ decreases, and although this is not fully understood it is believed to be caused by the effect of the kinetic energy of the air exhausting from the orifice impinging upon the recording surface, which tends to push the head away from the surface. In any event, it has been found that air heads having an angle $\gamma$ lying between 20° and 40° have a maximum $F_p$ and retain sufficient $F_h$ to yield completely satisfactory operation.

In accordance with the above discussion, the disclosed embodiment is provided with an angle $\gamma$ equal to approximately 30°. This is determined, as mentioned above, as the mean of the angles $\alpha$ and $\beta$ of the opposed surfaces 26 and 27 which are approximately equal to 25° and 35°, respectively. It will now be clear that when the air supply to the head of the invention fails the head is moved away from the recording surface by the action of the springs 15, and that when the air is again supplied to the head, the head is drawn back to its operative position adjacent the surface. Thus, the head is fail-safe, and possible damage to either the head or the recording surface is avoided in this manner. It should also be noted in this connection that in applications where it is desired to position the head in an inoperative position while it is being moved from one recording area to another, the head of the invention is well suited to these applications since it will be clear that by shutting off the air supply the head is moved away from the recording surface to permit it to be moved safely to the new location, at which time the air supply is again turned on and the head is drawn to its operative position adjacent the surface. Thus, by utilizing the teaching of the present invention an air head having greater attractive forces is obtained.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, thereof, to be limited only as indicated by the scope of the following claims.

What is claimed is:

1. An air head having a first position remote from a recording surface and a second position closely adjacent said surface including a face on said head arranged in opposition to said surface, an orifice in said face, and means for supplying air to said head for flow through said orifice, said orifice being arranged to exhaust the air therefrom at a divergent angle lying between 20° and 40° relative to said face wherein force developed due to the air flow pulls said head from said first position to said second position.

2. The invention set forth in claim 1 with the further provision that said head is yieldably biased in said first position.

3. An air head for supporting a transducer in spaced relation to a recording surface comprising a member having a face arranged to coact with said surface, said member being biased away from said surface to a first position remote therefrom, and an orifice in said head for exhausting air from said face at a divergent angle lying between 20° and 40° relative to the plane of said face, whereby air flow through said orifice generates forces which overcome said bias and draw said head from said first position to a second position adjacent said surface.

4. An air head for supporting a magnetic transducer in spaced relation to a recording surface comprising a member having a face arranged to coact with said surface, an annular orifice opening onto said face, and means for supplying air to said head for flow through said orifice, said orifice being arranged in such a way that air is exhaused therefrom at a divergent angle lying between 20° and 40° whereby said head is adapted to draw itself to the recording surface from a position remote therefrom.

5. An air head for supporting a transducer in spaced relation to a recording surface, comprising a member having a face for coacting with said surface, said member having an operative position with said face spaced closely adjacent said surface and an inoperative position with said face spaced remote from said surface, means for biasing said head to said inoperative position, and an orifice in said head for exhausting air therefrom at a divergent angle lying between 20° and 40° relative to said face for overcoming said bias and drawing said head from said inoperative position into said operative position, whereby upon failure of the air supply said head is moved by said bias to said inoperative position.

6. An air head having an improved ability to draw itself from a first position remote from a surface to a second position closely adjacent said surface comprising a face of said head having an annular orifice, means for supplying air to said head for flow through said orifice, said orifice being defined by the opposed surfaces of two concentric head members and said opposed surfaces being arranged in such a manner that the air is exhausted therefrom at a divergent angle lying between 20° and 40°, and means for yieldably urging said head into said first position whereby in the absence of air supplied to said orifice said head is positioned by said yieldable means in said first position, and when air is supplied to said orifice the air exhausting therefrom overcomes said yieldable means and draws said head to said second position.

7. An air head having a first position remote from a recording surface and a second position closely adjacent said surface including a surface of said head arranged in parallel relation with said recording surface at a predetermined distance therefrom, an orifice in said head surface comprising an endless slit with a static portion enclosed therewithin, and means for supplying air under pressure to said orifice, the said slit being arranged at a divergent angle lying between 20° and 40° with respect to said head surface to withdraw air from said static portion whereby the pressure reduction therein causes the said head to be drawn to said recording surface.

References Cited in the file of this patent

UNITED STATES PATENTS

| | | |
|---|---|---|
| 1,387,746 | Webb | Aug. 16, 1921 |
| 1,990,548 | Keller et al. | Feb. 12, 1935 |
| 2,038,216 | Harrison et al. | Apr. 21, 1936 |
| 2,527,586 | Small | Oct. 31, 1950 |
| 2,612,566 | Anderson | Sept. 30, 1952 |

FOREIGN PATENTS

| | | |
|---|---|---|
| 688,554 | Great Britain | Mar. 11, 1953 |

UNITED STATES PATENT OFFICE

CERTIFICATE OF CORRECTION

Patent No. 2,886,651 May 12, 1959

Norman A. Vogel

It is hereby certified that error appears in the printed specification of the above numbered patent requiring correction and that the said Letters Patent should read as corrected below.

Column 3, line 28, for "sufficient" read -- insufficient --; column 4, line 12, for "thereof" read -- therefore --; lines 43 and 44, for "exhaused" read -- exhausted --.

Signed and sealed this 13th day of October 1959.

(SEAL)
Attest:

KARL H. AXLINE
Attesting Officer

ROBERT C. WATSON
Commissioner of Patents